United States Patent
Atia et al.

(10) Patent No.: US 9,674,078 B2
(45) Date of Patent: *Jun. 6, 2017

(54) ASSIGNING COMMUNICATION PATHS AMONG COMPUTING DEVICES UTILIZING A MULTI-PATH COMMUNICATION PROTOCOL

(71) Applicant: International Business Machines Corporation, Armonk, NY (US)

(72) Inventors: Ohad Atia, Haifa (IL); Yuval A. Ben-Horin, Petah Tikva (IL); Alon Marx, Matan (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/365,997

(22) Filed: Dec. 1, 2016

(65) Prior Publication Data

US 2017/0078192 A1    Mar. 16, 2017

Related U.S. Application Data

(63) Continuation of application No. 15/209,775, filed on Jul. 14, 2016, now Pat. No. 9,531,626, which is a
(Continued)

(51) Int. Cl.
  *G06F 15/16* (2006.01)
  *H04L 12/707* (2013.01)
  (Continued)

(52) U.S. Cl.
  CPC .............. *H04L 45/24* (2013.01); *H04L 29/06* (2013.01); *H04L 29/12924* (2013.01);
  (Continued)

(58) Field of Classification Search
  CPC ....... H04L 45/22; H04L 45/24; H04L 47/125; H04L 67/1097; H04L 67/1002; H04L 69/14; H04L 29/06; H04L 29/12924
  (Continued)

(56) References Cited

U.S. PATENT DOCUMENTS 7,739,415 B2   6/2010   Banzhaf et al.
8,032,730 B2   10/2011   Hara
(Continued)

OTHER PUBLICATIONS

Adlung, et al., "FCP for the IBM eServer zSeries systems: Access to distributed storage", IBM J. Res. & Dev., vol. 46, No. 4/5, Jul./Sep. 2002, Received Nov. 27, 2001, accepted for publication Apr. 8, 2002, copyright 2002 IBM, pp. 487-502.
(Continued)

*Primary Examiner* — Kyung H Shin
(74) *Attorney, Agent, or Firm* — Daniel R. Simek

(57) ABSTRACT

A method for routing communication paths among computing devices. The method includes a one or more computer processors identifying a computing entity and a data storage entity that transfer data. The method further includes determining a plurality of communication ports that the data storage entity utilizes to transfer data to the computing entity. The method further includes identifying a plurality of computing resources respectively associated with the determined plurality of communication ports that the data storage entity utilizes to transfer the data to the computing entity. The method further includes generating a list of tuples for the data storage entity based, at least in part, on the identified plurality of computing resources and the determined plurality of communication ports.

1 Claim, 7 Drawing Sheets

Related U.S. Application Data continuation of application No. 15/014,191, filed on Feb. 3, 2016, now Pat. No. 9,461,867, which is a continuation of application No. 14/828,895, filed on Aug. 18, 2015.

(51) Int. Cl.

| | | |
|---|---|---|
| *H04L 29/08* | (2006.01) | |
| *H04L 29/06* | (2006.01) | |
| *H04L 12/803* | (2013.01) | |
| *H04L 29/12* | (2006.01) | |

(52) U.S. Cl.
CPC ............ *H04L 45/22* (2013.01); *H04L 47/125* (2013.01); *H04L 67/1002* (2013.01); *H04L 67/1097* (2013.01); *H04L 69/14* (2013.01)

(58) Field of Classification Search
USPC .................. 709/228, 238; 370/220, 225, 230
See application file for complete search history.

(56) References Cited

U.S. PATENT DOCUMENTS

| | | |
|---|---|---|
| 8,274,881 B2 | 9/2012 | Allen et al. |
| 8,364,869 B2 | 1/2013 | Arakawa et al. |
| 8,510,815 B2 | 8/2013 | Sekiguchi et al. |
| 8,705,351 B1 | 4/2014 | McGlaughlin et al. |
| 8,743,872 B2 | 6/2014 | Chidambaram et al. |
| 8,848,727 B2 | 9/2014 | Saraiya et al. |
| 8,856,337 B2 | 10/2014 | Otani |
| 8,914,553 B2 | 12/2014 | Baker et al. |
| 8,918,537 B1 | 12/2014 | Sandstrom et al. |
| 9,461,867 B1 | 10/2016 | Atia et al. |
| 2002/0178268 A1 | 11/2002 | Aiken, Jr. et al. |
| 2003/0189929 A1 | 10/2003 | Matsuzaki et al. |
| 2015/0023361 A1 | 1/2015 | Rastogi et al. |

OTHER PUBLICATIONS

Srikrishnan, et al., "Sharing FCP adapters through virtualization", IBM J. Res. & Dev., vol. 51, No. 1/2, Jan./Mar. 2007, Received Mar. 10, 2006, accepted for publication Jun. 16, 2006, Internet publication Jan. 11, 2007, copyright 2007 IBM, pp. 103-118.

List of IBM Patents or Patent Applications Treated as Related, Appendix P, Filed Herewith.

Atia, et al., U.S. Appl. No. 15/014,191, filed Feb. 3, 2016.

Atia, et al., U.S. Appl. No. 14/828,895, filed Aug. 18, 2015.

U.S. Appl. No. 15/209,775, filed Jul. 14, 2016, Entitled Assigning Communiction Paths Among Computing Devices Utilizing a Multi-Path Communication Protocol.

TARGET PORT LIST FOR SAN 105

| INITIATOR | SERVER | COMMUNICATION ADAPTER | PORT |
|---|---|---|---|
| VP203 | 340 | A341 | VP344 |
| VP203 | 350 | A351 | P352 |
| VP203 | 360 | A361 | P362 |
| VP203 | 340 | A347 | P348 |
| VP205 | 350 | A357 | P358 |
| VP205 | 360 | A367 | P368 |
| VP205 | 340 | A341 | VP345 |
| VP205 | 350 | A351 | P353 |
| VP207 | 360 | A361 | P363 |
| VP207 | 340 | A347 | P349 |
| VP207 | 350 | A357 | P359 |
| VP207 | 360 | A367 | P369 |
| P217 | 340 | A341 | P343 |
| P217 | 350 | A351 | P352 |
| P217 | 360 | A361 | P362 |
| P217 | 340 | A347 | P348 |
| P217 | 350 | A357 | P358 |
| P217 | 360 | A367 | P368 |
| P218 | 340 | A341 | VP344 |
| P218 | 350 | A351 | P352 |
| P218 | 360 | A361 | P362 |
| P218 | 340 | A347 | P348 |
| P218 | 350 | A357 | P358 |
| P218 | 360 | A367 | P368 |

ASSIGNING COMMUNICATION PATHS AMONG COMPUTING DEVICES UTILIZING A MULTI-PATH COMMUNICATION PROTOCOL

BACKGROUND OF THE INVENTION

The present invention relates generally to the field of network communications, and more particularly to controlling the network connections utilized by multi-path data transmissions protocols.

In a distributed computing environment, large volumes of information can be stored on systems that are optimized for data storage, such as a network-attached storage (NAS) system and/or a storage area network (SAN). The execution of software and programs can be deployed to hardware that supports virtual systems (e.g., virtual machines). In addition, various components within a computing system can be virtualized, such as network switches and communication adapters. A virtual machine (e.g., an application server) can be dynamically configured (e.g., computational speed, multitasking, high-volume network traffic, response time, reliability, etc.) and optimized for the applications executed on the virtual machine (VM). In contrast, some objectives of utilizing NAS and/or SAN systems, as opposed to integrating data storage on a computing system hosting VMs, are: improved availability (e.g., fault-tolerance), improved performance (e.g., bandwidth), improved scalability, and improved maintainability (e.g., disaster recovery processes).

Various network topologies exist that can enable the communication between a computing system hosting VMs and a SAN storing the information utilized by a VM. A mesh network topology provides at least two nodes with two or more communication paths between the nodes, which provides redundant paths for the communications. In addition, various communication protocols can be utilized within a communication network. Some networking protocols (e.g., Fibre Channel Protocol (FCP)) are implemented on the communication adapters (e.g., host bus adapters), which reduces the resource demands on central processing units (CPUs) within a computing system and/or a SAN. Other networking protocols can take advantage of the redundant paths within some networks to increase the bandwidth of information transfer. Two such protocols are Stream Control Transmission Protocol (SCTP) and Multi-path Transmission Control Protocol (MPTCP). In addition, various virtualization technologies can be applied to communication ports of a computing system and/or a SAN. In one instance, virtualizing port IDs improves the isolation of VMs utilizing the same physical port on a SAN.

SUMMARY

Aspects of an embodiment of the present invention disclose a method, computer program product, and computing system for routing communication paths among computing devices. The method includes one or more computer processors identifying a computing entity and a data storage entity that transfers data. The method further includes determining a plurality of communication ports that the data storage entity utilizes to transfer data to the computing entity. The method further includes identifying a plurality of computing resources respectively associated with the determined plurality of communication ports that the data storage entity utilizes to transfer the data to the computing entity. The method further includes generating a list of tuples for the data storage entity based, at least in part, on the identified plurality of computing resources and the determined plurality of communication ports.

BRIEF DESCRIPTION OF THE DRAWINGS

FIG. 6 depicts an illustrative example of a portion of a list of communication ports for a storage area network, sorted, in accordance with an embodiment of the present invention.

DETAILED DESCRIPTION

Figure 1:
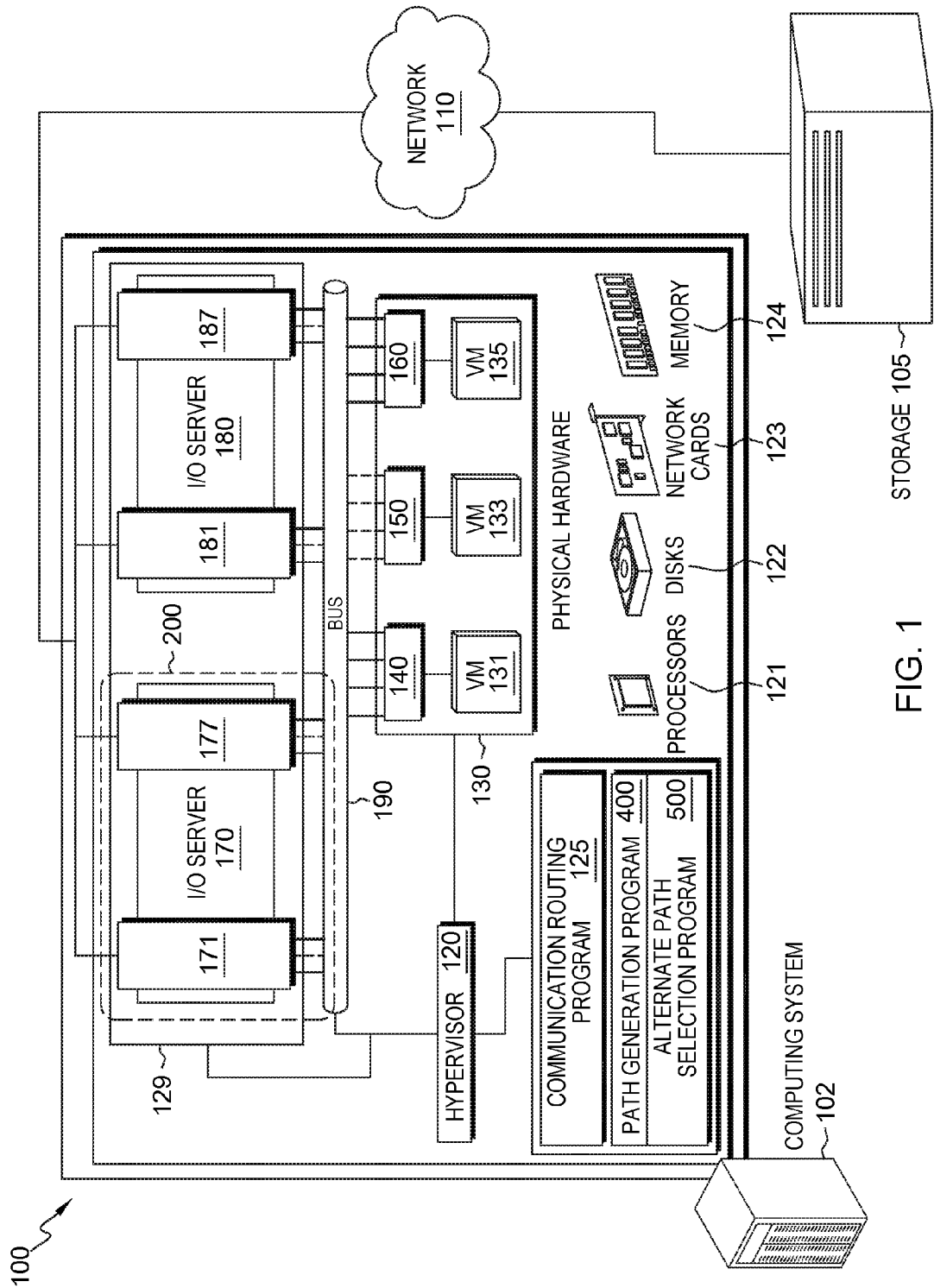
FIG. 1 illustrates a distributed computing environment, in accordance with an embodiment of the present invention.

Embodiments of the present invention recognize that virtual environments for application servers as well as storage systems is an area of growth for some businesses. Data center decentralization and Cloud computing are two factors that contribute to this growth. To ensure that the transmission of data among application servers and SAN and/or NAS systems is reliable and low-latency, multi-path information transfer may be utilized. Some networking technologies utilize a World Wide Name (WWN) as a unique identifier for a storage technology. Some storage technologies that utilize WWNs are Fibre Channel (FC), serial-attached virtual Small Computer Serial Interface (SAS), and Advanced Technology Attachment (ATA). In one instance, a WWN may be used as a World Wide Node Name (WWNN) to identify a switch. In another instance, a World Wide Port Name (WWPN) may be utilized to identify a port on a switch (e.g., communication adapter). To reduce the number of physical ports required on communication adapters (e.g., host bus adapters (HBA)) of a computing system, SAN, and/or a NAS, N_Port_ID Virtualization (NPIV) may be utilized. In addition, without NPIV, the logical unit number (LUNs) (e.g., storage devices) zoned to a specific physical N_Port_ID would be visible to any VM that is connected to that N_Port_ID. NPIV enables multiple WWPNs to be assigned to a single physical N_Port. Different LUNs can be assigned to each WWPN rendering a LUN visible only to the VM that is zoned to a specific WWPN.

Embodiments of the present invention recognize that in a computing system that utilizes virtualization (e.g., hypervisor based), a large number of VMs may be provisioned. The communication ports on the computing system are "initiators" of the communication with a storage system. By utilizing I/O and port virtualization, the total number of possible communication paths that can be created between the VMs and a network, in some instances, may exceed 10,000 paths. Similarly, a storage system (e.g., a SAN) can present a large number of possible connections (targets) to a network. This large number of possible connection paths (e.g., routes) may provide connection redundancy between a VM and a storage device; however, this does not preclude creating "bottle-necks" at the physical ports of a storage device. Embodiments of the present invention recognize that simply limiting the number of connection paths may result in a limited number of hardware components and ports being utilized generating "hot spots" or congestion while other hardware components and ports are not utilized.

Embodiments of the present invention provide redundancy and load balancing for VMs of a computing system that communicate information over a network to a storage system utilizing a multi-path communication protocol. Embodiments of the present invention determine the communication resources (e.g., servers, HBAs, physical ports, physical port IDs, virtual port IDs, etc.) available on a storage system and the requirements (e.g., LUNs, bandwidth, timeout constraints, fault-tolerance, etc.) of the VMs and associated software executing on the VMs of a computing system that communicate with the storage system. The computing resources of a storage system are identified, and a sorted list of the computing resources is generated, in accordance with an embodiment of the present invention. In some embodiments of the present invention, computing resources of a storage system are cyclically distributed, based on a hardware hierarchy as a method to minimize the effects of faults that may occur on a storage system. The sorted list includes the targets (e.g., port IDs, WWPNs) on the storage system. The targets are distributed among the initiators (e.g., port IDs, WWPNs) utilized by one or more VMs of a computing system. In addition, embodiments of the present invention recognize that a computing system and/or a storage system may reserve one or more system (e.g., computing) resources. In an embodiment of the present invention, a computing system includes a communication routing program that utilizes information associated with the initiator-target assignments for negotiating (e.g., handshaking) the communication paths between a computing system and a storage system.

In one embodiment, a percentage of the total possible targets is assigned to each initiator. In another embodiment, the number of targets assigned to an initiator is related to the bandwidth associated with a VM and/or software application executing on a VM. In addition, embodiments of the present invention recognize that VMs of a computing system may be dynamically created (e.g., provisioned), paused, stopped, and destroyed. Limiting the distribution of the total number of targets provides a method to assign (e.g., allocate) targets to new initiators without generating a new sorted target list and renegotiating a plurality of communication paths between a computing system and a storage system. In some embodiments of the present invention, one or more communication paths between a computing system and a storage system are monitored. In an embodiment, the monitoring of one or more communication paths is utilized to detect communication faults. In another embodiment, the monitoring of one or more communication paths is utilized to verify that sufficient bandwidth (e.g., communication paths) is assigned to an initiator.

Embodiments of the present invention also recognize that a VM of a computing system may execute various software programs where each software program may utilize one or more initiators to communicate with a storage system. In some embodiments, each initiator utilized by a VM may be assigned a different number of targets on a storage system. In other embodiments, a software program is determined to have timeout constraints that may affect the routing selection method, routing selection delay, and target assignments. For example, a software program that includes a timeout constraint may fail, abort, and/or produce an error message when requested information requested from data storage is not received within a period of time dictated by the code of the software program.

An alternate embodiment of the present invention recognizes that multi-path communications may also exist within computing systems hosting application servers and data storage systems as part of input/output (I/O) virtualization. Some embodiments of the present invention may be utilized by internal communication networks to handle redundancy and load balancing issues.

The present invention will now be described in detail with reference to the Figures. FIG. 1 illustrates distributed computing environment 100, which includes computing system 102, storage 105, and network 110. An embodiment of distributed computing environment 100 includes computing system 102 and storage 105 interconnected over network 110. Many modifications to the depicted environment may be made by those skilled in the art without departing from the scope of the invention as recited by the claims.

In some embodiments, computing system 102 is comprised of physical and virtualized systems. Physical systems can be a stand-alone computer, or alternatively, a computing system utilizing clustered computers and components. Virtual systems are independent operating environments that use virtual resources made up of logical divisions of physical resources, such as processors 121, disks 122, network cards 123 (e.g., input/output (I/O) adapters), and memory 124. Hypervisor 120 provides the ability to divide physical computing system resources into isolated logical partitions. Each logical partition operates like an independent computing system running its own operating system (e.g., a virtual system). The independent operating environments controlled by a hypervisor may be structured in various schemes and hierarchies (e.g., logical partitions (LPAR), servers). In some embodiments, hypervisor 120 interfaces with communication routing program 125 as the status of one or more VM changes (e.g., provisioned, destroyed, etc.).

In some embodiments, in addition to creating and managing the logical partitions and associated VMs, hypervisor 120 manages communication between the logical partitions and other systems within computing system 102 via one or more virtual switches (not shown). In an embodiment, some virtual switches and internal network communications are represented by bus 190. To facilitate communication, each logical partition may include one or more virtual adaptors for communication between the VMs within a logical partition and VMs or other systems outside of the LPAR. For example, LPAR 130 includes virtual adapters 140, 150, and 160 associated with VM 131, VM 133, and VM 135, respectively. The type of the virtual adapter depends on the operating system used by the logical partition. Examples of virtual adapters include virtual Ethernet adapters, virtual fiber channel adapters, virtual small computer serial interface (SCSI) adapters, and virtual serial adapters. Some of the virtual adapters utilize bus 190 to facilitate communications. In an embodiment, bus 190 may be configured to create as a Virtual Local Area Network (VLAN) within computing system 102. In another embodiment, computing system 102 may utilize other technologies, such as Virtual Machine Communication Interface (VMCI) protocol or virtual network interface cards (VNIC), to enhance the communications among virtual adapters. Physical and virtual adapters within computing system 102 may utilize protocols that support communication via virtual port IDs (e.g., NPIV, WWPNs).

In some embodiments, computing system 102 is divided into logical partitions (LPARs) that include LPAR 129 and LPAR 130 with each LPAR executing an independent operating environment, such as an operating system (OS). In an embodiment, LPAR 129 contains an OS that supports a virtual I/O server (VIOS). The VIOS LPAR (i.e., LPAR 129) includes I/O server 170 and I/O server 180, with the I/O servers respectively including communication adapters (e.g., host bus adapters (HBA)) 171 and/or 177, and 181 and/or 187. In another embodiment, LPAR 130 includes VM 131, VM 133, and VM 135 executing a shared OS. In other embodiments, at least one of I/O server 170 and I/O server 180 are physical computer servers (e.g., blade servers, network servers, etc.) that communicate with various portions of computing system 102 via an internal communication system, bus 190.

In an embodiment, communications from network 110 are routed through communication adapters (e.g., HBAs, network interface cards (NIC), etc.) 171 and 177, and 181 and 187 of I/O server 170 and I/O server 180, respectively, on logical partition 129, to bus 190. Communications from virtual adapters 140, 150, and 160 in logical partition 130 may be routed through bus 190 to network 110, in accordance with an embodiment of the present invention. In one embodiment, one or more of communication adapters 171, 177, 181, and 187 are physical adapters included in network cards 123. In another embodiment, one or more of communication adapters 171, 177, 181, and 187 are virtual adapters derived from network cards 123. In an alternative embodiment, one or more physical network adapters are allocated to logical partition 130 for VM 131, 133, and 135 to function in place of instances of virtual adapters 140, 150, and 160.

In an embodiment, computing system 102 communicates through network 110 to storage 105 (e.g., a storage area network). One or more connections of computing system 102 to network 110 occur via ports; herein identified as initiators. One or more connections of storage 105 to network 110 occur via ports; herein identified as targets. Network 110 can be, for example, a local area network (LAN), a telecommunications network, a wireless local area network (WLAN), a wide area network (WAN), such as the Internet, or any combination of the previous, and can include wired, wireless, or fiber optic connections. In general, network 110 can be any combination of connections and protocols that will support communications between computing system 102 and storage 105, in accordance with embodiments of the present invention. In another embodiment, network 110 operates locally via wired, wireless, or optical connections and can be any combination of connections and protocols (e.g., NFC, laser, infrared, etc.). Network 110 may be configured in various topologies (e.g., bus, tree, mesh, hybrid, fabric, switched fabric, etc.).

Communication routing program 125 utilizes various communication protocols to communicate data between computing system 102 and storage 105, based on the networking technologies utilized by network 110 and the protocols supported by instances of physical and/or virtualized network adapters utilized by computing system 102 and storage 105. In one embodiment, communication routing program 125 utilizes one or more protocols that support multi-path data communication between computing system 102 and storage 105. In some embodiments, communication routing program 125 may establish (e.g., negotiate) a plurality of connections (e.g., communication paths) between computing system 102 and storage 105 and communicate information associated with the connections (e.g., initiator IDs, target IDs) to path generation program 400. In another embodiment, communication routing program 125 dictates the assignment of the target ports on storage 105 based on a sorted list of targets generated by path generation program 400. In an example, communication routing program 125 receives initiator-target assignment from path generation program 400 for initiator ports of computing system 102 (e.g., referencing FIG. 6, target port list for storage 105). In other embodiments, communication routing program 125 utilizes one or more networking utilities to determine information associated with a communication path. Information determined by communication routing program 125 may include: a status, a retry rate, a packet loss rate, a queuing delay, a propagation delay, an error rate, a fault, and a handshaking error.

In a further embodiment, communication routing program 125 may utilize technologies, such as N_Port_ID Virtualization (NPIV) and N_Port Virtualization (NPV) to enable one or more ports of I/O server 170 and I/O server 180 to be identified by more than one instance of a WWPN. In a different embodiment, communication routing program 125 enables multi-path communication (e.g., multi-path I/O) via I/O virtualization within computing system 102. For example, communication routing program 125 enables multi-path communication between VM 131 (e.g., processors 121) utilizing virtual adapter 140 (e.g., network cards 123) and disks 122.

Environment 200 includes I/O server 170, communication adapter 171, communication adapter 177, bus 190, and connections to network 110. Environment 200 is described in further detail with respect to FIG. 2.

Path generation program 400 determines which physical or virtual initiators (e.g., communication adapter ports) of computing system 102 communicate with storage 105 utilizing a multi-path communication protocol. Multiple instances of path generation program 400 may execute concurrently. Path generation program 400 may execute concurrently with alternate path selection program 500. In some embodiments, another instance of path generation program 400 may execute when a new VM activates. In an embodiment, path generation program 400 determines the number of targets available on storage 105 and the physical relationships (e.g., communication adapter address, server supporting a communication adapter) of those targets on storage 105. Path generation program 400 utilizes this information to determine the number of connections that may be utilized by each initiator and a group of targets that are assigned to each initiator. Path generation program 400 communicates groups of targets that are assigned to each initiator to communication routing program 125, which subsequently generates the connection paths between computing system 102 and storage 105 via network 110 utilizing a multi-path communication protocol. In other embodiments, path generation program 400 communicates with hypervisor 120 to determine when a new VM is provisioned and which initiators are utilized by the provisioned VM. In addition, path generation program 400 communicates with hypervisor 120 to determine when the status of a VM changes; for example, when a VM de-provisions and which initiators are associated with the de-provisioned VM.

In a further embodiment, path generation program 400 may monitor a communication path between an initiator and a target. In a scenario, if path generation program 400 detects a problem with a communication path (e.g., connection), path generation program 400 may activate alternate path selection program 500. In another embodiment, path generation program 400 may also determine which VM within LPAR 130 utilizes the initiator of the affected communication path.

Alternate path selection program 500 responds to faults detected in storage 105. Alternate path selection program 500 determines which targets (e.g., ports, port IDs, WWPNs, WWNNs) on storage 105 are associated with a fault detected on storage 105. Based on the sorted list of targets generated by path generation program 400, alternate path selection program 500 determines which initiators are assigned (e.g., connected) to the affected targets. In one embodiment, alternate path selection program 500 may communicate with communication routing program 125 and flag the affected connection to prevent further use of the flagged connection while the communication fault is present on storage 105. In another embodiment, if sufficient connections between an initiator and storage 105 are affected that degrade the communication bandwidth for a VM, alternate path selection program 500 may activate path generation program 400 to generate a new list of connections for the affected VM. In a further embodiment, alternate path selection program 500 may utilize information associated with a VM of an affected initiator determined by path generation program 400 (step 410) to determine if software executing on the VM includes timeout constraints which may be triggered by the affected communication connection.

Storage 105 includes data and information utilized by VM 131, VM 133, and VM 135. The data and information contained within storage 105 may include: text files, video files, audio files, numerical data, e-mail files, databases, etc. In one embodiment, storage 105 is a storage area network (SAN). In another embodiment, storage 105 is network-attached storage (NAS) system. In some embodiments, storage 105 may be a SAN-NAS hybrid system. In addition, storage 105 may utilize storage virtualization to enable additional functionality and more advanced features within a computer data storage system.

Figure 2:
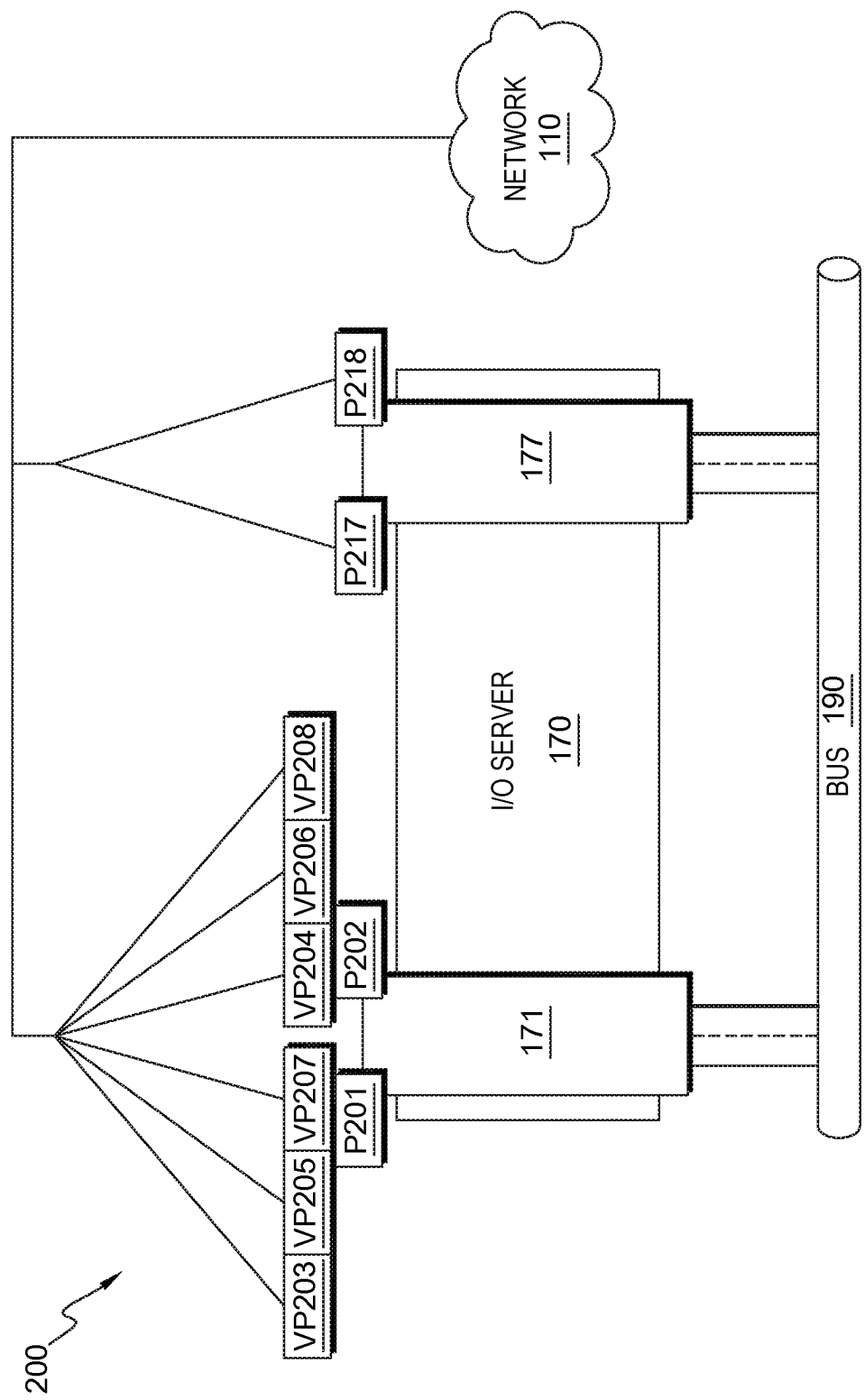
FIG. 2 depicts an illustrative example of a configuration of physical and virtual ports associated with communication adapters of a computing system to communicate with a network, in accordance with an embodiment of the present invention.

FIG. 2 depicts a functional block diagram illustrating environment 200 of computing system 102 within distributed computing environment 100 of FIG. 1. In an embodiment, environment 200 includes: I/O server 170, communication adapter 171, communication adapter 177, a portion of bus 190, and associated physical and virtual communication ports (i.e., ports) that connect to network 110. With respect to I/O server 170, communication adapter 171 includes physical ports P201 and P202, and communication adapter 177 includes physical ports P217 and P218. With respect to communication adapter 171, physical port P201 includes virtual ports VP203, VP205, and VP207. With respect to communication adapter 171, physical port P202 includes virtual ports VP204, VP206, and VP208. Communication adapters 171 and 177 may communicate with VM 131, VM 133, and VM 135 via bus 190. VM 131, VM 133, and VM 135 may utilize one or more ports: VP203, VP204, VP205, VP206, VP207, VP208, P217, and P218 to act as initiators (i.e., communication initiators) to communicate with storage 105 via network 110.

Figure 3:
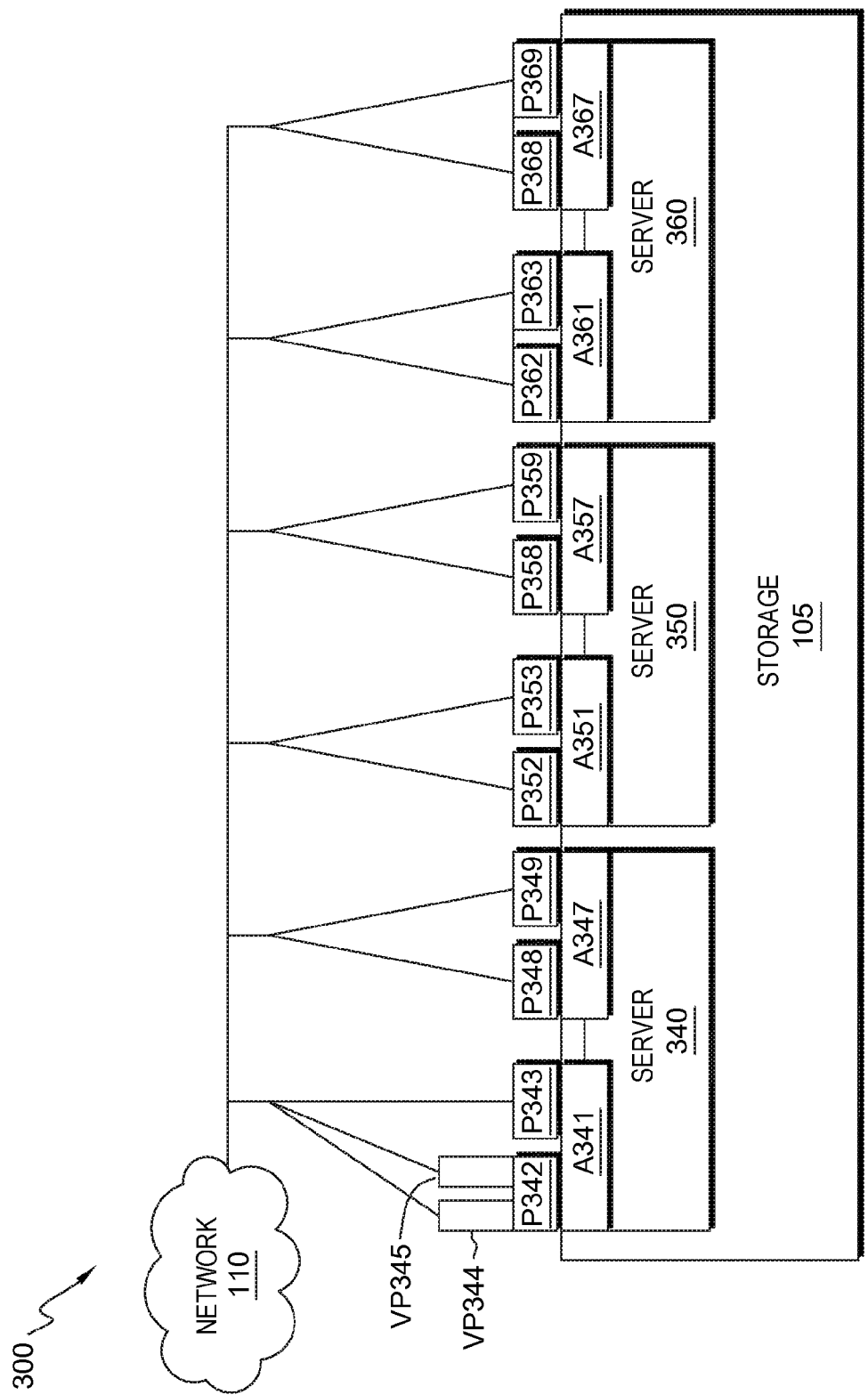
FIG. 3 depicts an illustrative example of a storage area network utilizing physical and virtual ports to communicate with a network, in accordance with an embodiment of the present invention.

FIG. 3 depicts a functional block diagram illustrating storage 105. In one embodiment, storage 105 includes: server 340, server 350, and server 360, where each server further includes two communication adapters and each communication adapter includes two physical ports. Storage 105 may also include, but is not shown: persistent storage devices (e.g., hard-disk arrays, magnetic tape libraries, optical jukeboxes, solid-state disk drives, etc.), support/monitoring hardware and software, virtualization firmware and software (e.g., a hypervisor), and networking devices. With respect to server 340, server 340 includes communication adapter A341 that includes physical ports P342 and P343; and communication adapter A347 that includes physical ports P348 and P349. In an embodiment, one physical port of communication adapter A341, port P342, may utilize NPIV to create virtual ports VP344 and VP345. With respect to server 350, server 350 includes communication adapter A351 that includes physical ports P352 and P353; and communication adapter A357 that includes physical ports P358 and P359. With respect to server 360, server 360 includes communication adapter A361 that includes physical ports P362 and P363; and communication adapter A367 that includes physical ports P368 and P369.

In a different embodiment, storage 105 utilizes I/O virtualization and multi-path communication within storage 105. For example, servers 340, 350, and 360 may have HBAs that communicate with the controllers of the storage devices (not shown) via storage virtualization utilizing NPIV and NPV. Some protocols utilized within storage 105 may include: Fibre Channel protocol (FCP), Internet SCSI (iSCSI), SAS, Fibre Channel over Internet Protocol (FCIP), ATA over Ethernet (AoE), and Fibre Channel over Ethernet (FCoE).

Figure 4:
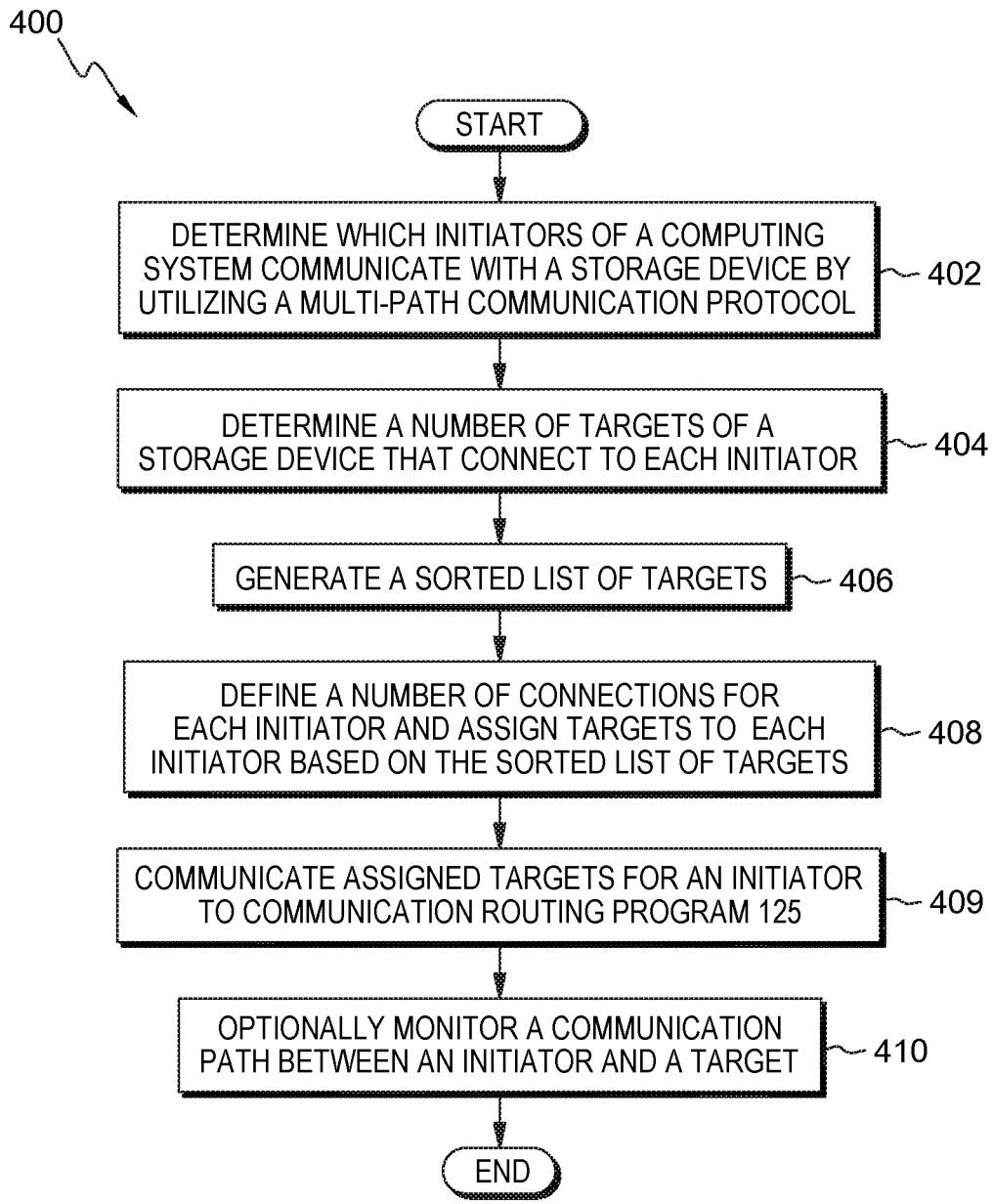
FIG. 4 depicts a flowchart of steps of a path generation program, in accordance with an embodiment of the present invention.

FIG. 4 is a flowchart depicting operational steps for path generation program 400, executing on computing system 102 within distributed computing environment 100 of FIG. 1. Path generation program 400 determines which initiators of a computing system communicate with a storage system utilizing a multi-path communication protocol. In addition, path generation program 400 generates a sorted list of targets (e.g., ports) and assigns groups of items (e.g., targets) from a sorted list that are available (e.g., not reserved, not flagged) on a storage system to various initiators of a computing device to improve the performance (e.g., bandwidth) and reliability (e.g., redundancy) of the multi-path communications between the computing device and the storage system.

In step 402, path generation program 400 determines which initiators of a computing system communicate with a storage system utilizing a multi-path communication protocol. In one embodiment, path generation program 400 determines which initiators of computing system 102 communicate with storage 105 by the protocol utilized by a communication connection. In an example, path generation program 400 may communicate with communication routing program 125 to determine which initiators of computing system 102 communicate with storage 105 via MPTCP, SCTP, and/or FCP. In another example, path generation program 400 utilizes handshaking information determined by communication routing program 125 to determine which initiators utilize a multi-path communication protocol. In another embodiment, path generation program 400 determines which initiators of computing system 102 utilize a multi-path communication protocol based on configuration information associated with a VM (e.g., VM 135). In one scenario, path generation program 400 may determine that an initiator (e.g., P218) utilizes a multi-path communication protocol based on the middleware and/or application programming interfaces (APIs) (not shown) executed by a VM (e.g., VM 131) that utilizes the initiator (e.g., P218). In another scenario, path generation program 400 determines which initiators utilize a multi-path communication protocol based in the provisioning information associated with a VM (e.g., VM 131).

In step 404, path generation program 400 determines a number of targets of a storage system that connect to each initiator. In an embodiment, path generation program 400 utilizes information determined by communication routing program 125 obtained while establishing a plurality of connections between computing system 102 and storage 105 to determine the number of targets that are connected to each initiator. In a further embodiment, path generation program 400 communicates with storage 105 to determine the number of targets (e.g., ports, port IDs) that are utilized by computing system 102 and which targets are reserved (e.g., inactive) on storage 105.

In step 406, path generation program 400 generates a sorted list of targets. Path generation program 400 generates a sorted list of targets (e.g., port ID's, WWNNs, WWPN) for storage 105 based on physical and virtual computing resources related to the targets. In an embodiment, the resources of storage 105 include one or more servers, where each server further includes one or more communication adapters, and each communication adapter further includes one or more ports.

In one embodiment, path generation program 400 generates a sorted list that may be described as a series of tuples in the format of (S,C,P) where (S), (C), and (P) respectively identify: a server, a communication adapter, and a communication port (e.g., a port ID). Each element within the tuple format of (S,C,P) is cyclically utilized. In this embodiment, path generation program 400 prioritizes the sort based on a hardware hierarchy (e.g., servers affect communication adapters, communication adapters affect ports). In an example, (referring to the elements within FIG. 3) utilizing the (S) and (C) elements of the tuple format, an instance of path generation program 400 generates the series: (340, A341), (350, A351), (360, A361), (340, A347), (350, A357), and (360, A367). In some scenarios, the length of the series generated by path generation program 400 is based on the total number of target ports on storage 105. In other scenarios, the length of the series generated by path generation program 400 is based on the number of target active ports on storage 105.

In some embodiments, one or more components of storage 105 may be virtualized. Referencing FIG. 3, path generation program 400 bases the sorted list on server 340, server 350, server 360, and the communication adapters (e.g., A341/A347, A351/A357, A361/A367) respectively associated with each server. Path generation program 400 also cyclically distributes the respective communication ports, physical and/or virtual, among each server/communication adapter combination. Referencing FIG. 3, the ports that are included in the list are VP344, VP345, P343, P38, P349, P352, P353, P358, P359, P363, P363, P368, and P369. In another embodiment, path generation program 400 applies a sorting routing on the components depicted in FIG. 3 to generate the target port list for storage 105 depicted in FIG. 6.

Referring to step 406, in other embodiments path generation program 400 does not include WWPNs as port IDs when generating a sorted list of targets. Path generation program 400 assigns the WWPN based on the LUNs that are utilized by a VM. In a different embodiment, path generation program 400 may create a sorted list of ports based on other factors. Such factors may include: connection speed, routing paths, connection reliability, etc.

In step 408, path generation program 400 defines a number of connections for each initiator and assigns targets to each initiator based on the sorted list of targets. Path generation program 400 may utilize one or more rules (e.g., determined by a system administrator, dictated by a software program, included in the provisioning of a VM, etc.). In one embodiment, path generation program 400 identifies the bandwidth needed for the multi-path communications of each initiator utilized by a VM (e.g., VM 131, VM 133, and VM 135) and determines a number of connections to storage 105 (e.g., targets) to support the identified bandwidth. In an instance, referring to the sorted list of FIG. 6 initiators VP203, VP205, and VP207 utilize a similar bandwidth (e.g., communication rate) and path generation program 400 assigns four connections (e.g., communication paths) to initiators VP203, VP205, and VP207. In another instance, path generation program 400 determines that initiator P217 utilizes a higher bandwidth and path generation program 400 assigns initiator P217 seven connections. In a different instance, path generation program 400 receives an indication from VM 135 that a program executing on VM 135, which utilizes initiator P218, includes timeout constraints. Path generation program 400 may determine that the bandwidth utilized by P218 is similar to VP203; however, path generation program 400 also determines that the program of VM 135 that utilizes P218 includes timeout constrains. Based on a timeout constraint associated with program associated with initiator P218, path generation program 400 assigns seven connections to P218 as opposed to four connection. In some scenarios, path generation program 400 dynamically defines the number of connections assigned to each initiator. In one instance, path generation program 400 utilizes historical data from a load balancing program (not shown) to define the number of connections assigned to each initiator utilizing multi-path communication. In another instance, path generation program 400 defines the number of connections assigned to each initiator based on the number of active VMs of computing system 102.

In another embodiment, path generation program 400 defines a uniform number of connections to each initiator utilizing a multi-path communications. In one scenario, path generation program 400 utilizes information obtained from the administrator of computing system 102 to define the number of connections that are assigned to each initiator utilizing multi-path communications with storage 105. In another scenario, path generation program 400 defines a number of connections assigned to each initiator based on a percentage of the total available targets on storage 105, rounded to a whole number of connections. For an example, storage 105 includes 1600 target port IDs and computing system 102 has 200 initiators that utilize multi-path communications. Path generation program 400 assigns 40% of the target to the initiators engaged in multi-path communications with storage 105. In this example, path generation program 400 assigns 3 connections, 3.2 rounded to the nearest integer number of connections, to each of the 200 initiators. In some scenarios, path generation program 400 utilizes unassigned targets of a sorted target list to assign targets to new initiators that utilize multi-path communication. In other scenarios, path generation program 400 returns assigned targets to a sorted target list when an initiator utilizing multi-path communication is not used (e.g., VM utilizing the initiator is de-provisioned).

Referring to step 408, in further embodiment path generation program 400 may communicate with storage 105 to determine the number of targets (e.g., ports, port IDs, WWPNs, WWNNs) available prior to assigning a number of connections to initiators on computing system 102. Based on the information communicated to path generation program 400 by storage 105 in some instances the reserved ports are excluded from the sorted list generation (step 406). In other instances, path generation program 400 includes the reserved ports in the sorted port list; however, path generation program 400 does not assign the reserved ports to an initiator. In some scenarios, path generation program 400 determines that storage 105 reserves a portion of the available targets. For example, path generation program 400 determines that storage 105 reserves targets, P368 and P369 of communication adapter A367 on server 360. In one instance, the reserved targets are released for during workload spikes. In another instance, the reserved targets are released when a communication fault is identified on storage 105 (e.g., a HBA failure, a communication adapter, a networking cable failure, a server failure, etc.).

In step 409, path generation program 400 communicates the assigned targets for an initiator to communication routing program 125. Subsequently, communication routing program 125 utilizes the assigned targets for an initiator to modify the connection paths of network 110 utilized by computing system 102 to communicate with storage 105. In one embodiment, path generation program 400 may transfer a list of ports (e.g., group) associated with each initiator to communication routing program 125. For example, path generation program 400 communicates the list depicted in FIG. 6 to communication routing program 125. In another embodiment, path generation program 400 may communicate changes associated with individual initiators to communication routing program 125. In an example, VM 131, which utilizes initiator VP203, is de-provisioned. Path generation program 400 communicates to communication routing program 125 that initiator VP203 is not utilized. In another example, path generation program 400 determines that a new VM is provisioned and communicates a group of unassigned, substantially sequential targets from the sorted list of targets to the initiator associated with the new VM to communication routing program 125. In some embodiments, path generation program 400 may assign multiple WWPNs to targets on storage 105 when NPIV is utilized. Path generation program 400 may utilize this strategy to zone specific LUNs of storage 105 to a VM (e.g., VM 135) on computing system 102. Path generation program 400 includes the WWPN assignments with the initiator-target assignment communicated to communication routing program 125.

In step 410, path generation program 400 optionally monitors a communication path between an initiator and a target. In one embodiment, path generation program 400 may monitor one or more communication paths associated with an initiator to ensure that sufficient connections were assigned to meet a bandwidth dictate of an initiator. In another embodiment, path generation program 400 may monitor one or more communication paths for an initiator associated with a program that includes timeout constraints. In one scenario, path generation program 400 may execute alternate path selection program 500 to determine if a communication path issue is related to a fault on storage 105. In another scenario, path generation program 400 may determine that a communication path issue is not associated with a fault on storage 105. In one instance, path generation program 400 may communicate with hypervisor 120 to assign another initiator to a VM associated with the affected communication path. In another instance, the path may fail due to another fault on: computing system 102, storage 105, and/or network 110. Examples of other issues that affect communication paths between computing system 102 and storage 105 are: incorrect hardware setting, duplicate IP addresses, access authority, errors in LUN masking, and incorrect LUN zoning.

Figure 5:
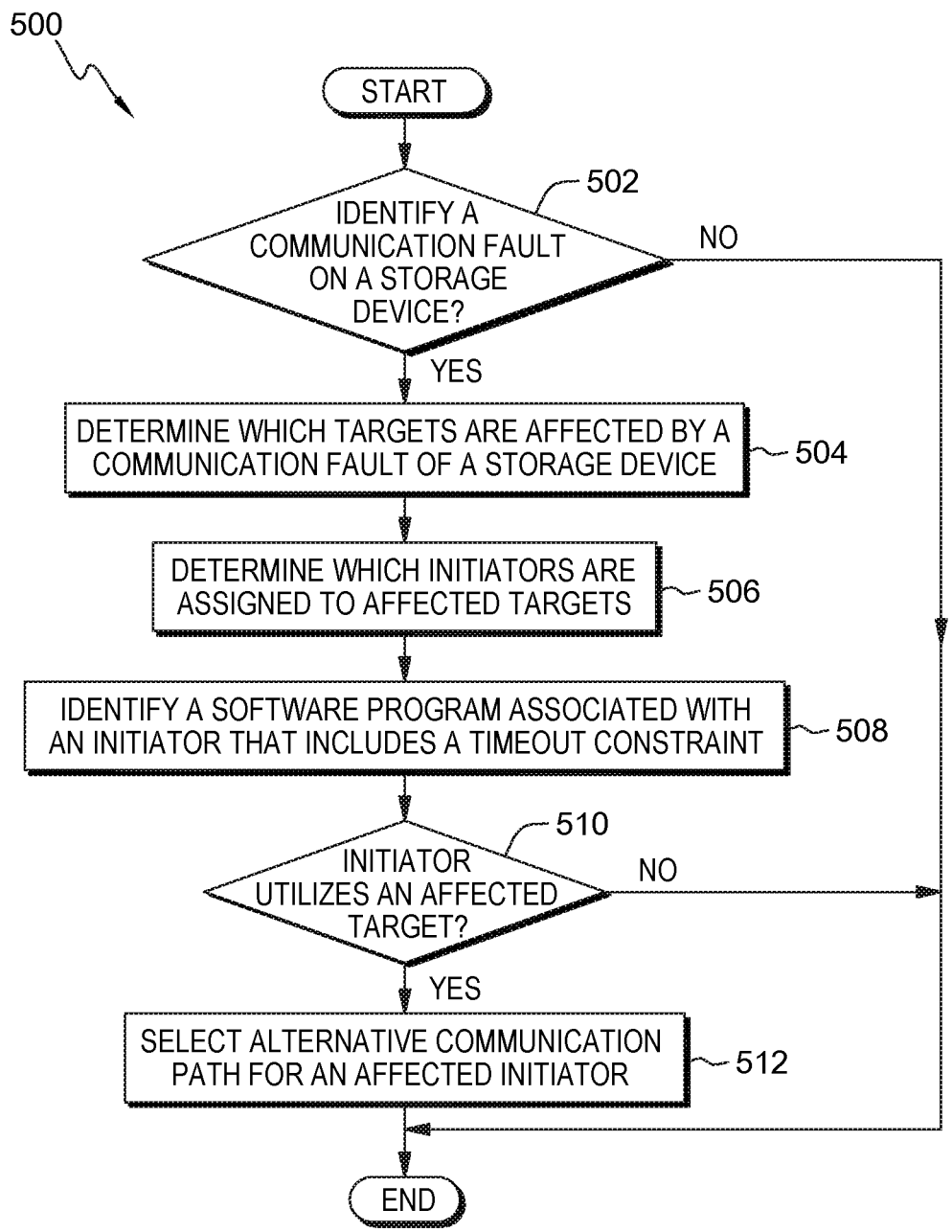
FIG. 5 depicts a flowchart of steps of an alternate path selection program, in accordance with an embodiment of the present invention.

FIG. 5 is a flowchart depicting operational steps for alternate path selection program 500, executing on computing system 102 within distributed computing environment 100 of FIG. 1. Alternate path selection program 500 determines whether one or more communication faults may be related to a fault on storage 105. If alternate path selection program 500 identifies a communication fault associated with storage 105, then alternate path selection program 500 determines which targets are affected and whether an affected target includes a timeout constraint. Subsequently, alternate path selection program 500 utilizes one or more techniques to select unassigned communication paths (e.g., target ID's) and communicates the alternative communication path to communication routing program 125 and/or path generation program 400.

In decision step 502, alternate path selection program 500 identifies whether a communication fault is associated with a fault on a storage system. In one embodiment, alternate path selection program 500 receives information from communication routing program 125 that one or more connection paths are not established with storage 105. In another embodiment, alternate path selection program 500 determines that there is a fault on storage 105 from a communication (e.g., status message) between storage 105 and computing system 102. Responsive to determining that a communication fault is identified on storage 105 (yes branch, decision step 502), alternate path selection program 500 determines which targets are affected by a communication fault of a storage system (step 504).

In step 504, alternate path selection program 500 determines which targets are associated with a communication fault of a storage system. In one embodiment, alternate path selection program 500 determines which targets (e.g., port IDs) are affected by a hardware fault. In one scenario, alternate path selection program 500 communicates with a monitoring program on storage 105 to determine that a server is associated with an identified communication fault. In an example, (referring to FIG. 3) if server 360 is shutdown, then alternate path selection program 500 determines that targets (e.g., ports) P362, P363, P368, and P369 are affected. In another scenario, if a communication fault on storage 105 is associated with communication adapter A357, then alternate path selection program 500 determines that targets P358 and/or P359 may be affected. In this scenario, alternate path selection program 500 may require additional information from storage 105 to determine whether one or both of targets P358 and P359 are affected by a fault on communication adapter A357.

In another embodiment, alternate path selection program 500 determines which targets (e.g., port IDs) are affected by a software fault. In one scenario, alternate path selection program 500 communicates with a hypervisor of storage 105 to determine whether internal communication occurs among storage systems and server 340, server 350, and server 360. In an example (referring to FIG. 3), if alternate path selection program 500 determines that server 360 is affected by an internal communication fault of storage 105, then alternate path selection program 500 determines that targets (e.g., ports) P362, P363, P368, and P369 are affected. In another scenario, if alternate path selection program 500 determines that NPID virtualization is associated with a communication fault on storage 105, then alternate path selection program 500 determines that targets VP344 and VP345 are affected.

Referring to step 504 in a different embodiment, alternate path selection program 500 communicates with communication routing program 125 to determine which targets of storage 105 are affected by a communication fault based on one or more network diagnostics executed by communication routing program 125. In an example, communication routing program 125 may periodically utilize a traceroute function (not shown) to identify which connection paths cannot be accessed. In another example, communication routing program 125 may utilize a neighbor discovery protocol monitor (not shown) to identify which connection paths cannot be accessed.

In step 506, alternate path selection program 500 determines which initiators are assigned to affected targets. In an embodiment, alternate path selection program 500 communicates with communication routing program 125 to determine the one or more initiators that are assigned to the affected targets. In another embodiment, alternate path selection program 500 communicates with path generation program 400 to obtain the sorted list of targets and the initiator-target assignments to determine the one or more initiators that are assigned to the affected targets.

In step 508, alternate path selection program 500 identifies a software program associated with an initiator that includes a timeout constraint. In one embodiment, alternate path selection program 500 communicates with path generation program 400 to determine whether a software program, executing on computing system 102, that utilizes an affected target on storage 105 includes a timeout constraint. In another embodiment, alternate path selection program 500 communicates with hypervisor 120 to determine whether a software program, executing on computing system 102, that utilizes an affected target on storage 105 includes a timeout constraint. In a further embodiment, alternate path selection program 500 determines from communications with path generation program 400 that the initiator associated with a timeout constraint is also affected by varying bandwidth utilization.

In decision step 510, alternate path selection program 500 determines whether an initiator utilizes an affected target. In one embodiment, alternate path selection program 500 determines that an initiator is affected based on a determined timeout constraint of a VM and/or program that utilizes a target that is affected by a fault. In another embodiment, alternate path selection program 500 determines that an initiator is associated with an affected target based on information obtained from path generation program 400. In one scenario, alternate path selection program 500 determines that an initiator is affected based on "quality of service" measurements (e.g., error rates, retry rates, etc.) obtained from path generation program 400. In another scenario, alternate path selection program 500 determines that sufficient communication paths do not exist for an initiator based on a bandwidth constraint of a VM and/or software program.

In decision step 510, in response to a determination that alternate path selection program 500 determines that an initiator utilizes an affected target (yes branch, decision step 510), alternate path selection program 500 selects an alternative communication path for an affected initiator (step 512).

In step 512, alternate path selection program 500 selects an alternative communication path for an affected initiator. In one embodiment, alternate path selection program 500 determines that the affected initiator is not associated with a software program that includes a timeout constraint. In one scenario, alternate path selection program 500 communicates to communication routing program 125 which target of storage 105 is affected and that communication routing program 125 may proceed to another assigned target. Alternate path selection program 500 may utilize various scheduling or queuing algorithms for selecting the other assigned target. Examples of queuing algorithms that alternate path selection program 500 may utilize include: round robin, weighted round robin, deficit round robin, multilevel queuing, and random. In addition, alternate path selection program 500 flags the affected target to communication routing program 125 so that the affected target is excluded from subsequent multi-path data communications. In another scenario, alternate path selection program 500 determines from communications with path generation program 400 that an initiator has a bandwidth constraint. Alternate path selection program 500 communicates the information related to the affected target to path generation program 400 for path generation program 400 to communicate a replacement target assignment to communication routing program 125.

In another embodiment, alternate path selection program 500 determines that the affected initiator is associated with a software program that includes a timeout constraint. In one scenario, alternate path selection program 500 communicates to communication routing program 125 which target of storage 105 is affected and that communication routing program 125 may reduce the delay and/or number of communication retries before proceeding to the next assigned target in round-robin fashion. In addition, alternate path selection program 500 flags the affected target to communication routing program 125 so that the affected target is excluded from subsequent multi-path data communications.

Referring to step 512, in another scenario, alternate path selection program 500 communicates with path generation program 400 to replace the affected targets with a new group of target assignments from the sorted target list for storage 105. Subsequently, path generation program 400 communicates the replacement target assignments to communication routing program 125. In another scenario, alternate path selection program 500 determines that an affected initiator includes both a timeout constraint and variable bandwidth utilization. In an instance, alternate path selection program 500 communicates with path generation program 400 to replace the affected targets with a new group of target assignments from the sorted target list for storage 105, where the new group of targets is larger to support periods of higher bandwidth utilization. Subsequently, path generation program 400 communicates the new and larger group of target assignments to communication routing program 125.

Referring to decision step 502, responsive to determining that a communication fault is not identified on storage 105 (no branch, decision step 502), alternate path selection program 500 terminates.

Referring to decision step 510, in response to a determination that alternate path selection program 500 determines that an initiator does not utilizes an affected target (no branch, decision step 510), alternate path selection program 500 terminates.

FIG. 6 is an illustrative example of a portion of a list of target ports on storage 105 and the initiators of computing system 102 that may utilize the target ports. FIG. 6 depicts twenty-four targets assigned to five initiators, in accordance with an embodiment of the present invention. Target port list for storage 105 is generated based on an embodiment of path generation program 400 (referencing step 406). Column 602 depicts the assignment of five physical and virtual initiators of computing system 102 to targets (e.g., ports) of storage 105, in accordance with an embodiment of the present invention. Column 604 depicts a cyclical assignment of servers, server 340 then server 350, then server 360, and the cycle begins again with server 340. Column 606 depicts a cyclical assignment of communication adapters respectively associated with each instance of a server (referencing FIG. 3). In an example, communication adapter A341 is assigned to the first, third, fifth, and seventh instances of server 340.

Communication adapter A347 is assigned to the second, fourth, sixth, and eighth instances of server 340. Column 608 depicts a cyclical assignment of physical and virtual ports (e.g., targets) respectively associated with each instance of a communication adapter (referencing FIG. 3). In an example, virtual port VP344 is assigned to the first and fourth instances of communication adapter A341. Virtual port VP345 is assigned to the second instance of communication adapter A341, and port P343 is assigned to the third instance of communication adapter A341.

In an example, initiator P217 is assigned ports P343, P352, P362, P348, P358, and P368. Row 610 depicts an instance where alternate path selection program 500 determines that communication adapter A361 (stippled shading) of storage 105 is identified as having a communication fault. In an embodiment, alternate path selection program 500 may determine that there is no impact to initiator P217. Alternate path selection program 500 communicates with communication routing program 125 to proceed with a round-robin utilization of ports P343, P352, P348, P358, and P368 for multi-path communication between computing system 102 and storage 105.

In another example, initiator P218 is assigned ports VP344, P352, P362, P348, P358, and P368. Row 615 and row 616 depict an instance where alternate path selection program 500 determines that server 350 (random stipple shading) of storage 105 is identified as having a communication fault. A fault in server 350 affects targets P352, P353, P358, and P359. In an embodiment, alternate path selection program 500 may determine, based on communications with path generation program 400, that initiator P218 is bandwidth constrained based on losing the communication paths associated with targets P352 and P358. Alternate path selection program 500 communicates with path generation program 400 that additional targets are needed to maintain the bandwidth dictated by initiator P218. In a scenario, initiators VP203, VP205, VP207, P217, and P218 of computing system 102 are engaged in multi-path communication with storage 105. Based on the bandwidth constraint of initiator P218, path generation program 400 assigns the next two target ports in sequence. The tuples that describes the two target ports in sequence are: server 340/communication adapter A341/port VP345 and server 350/communication adapter A351/port P353. However, port P353 is affected by the fault in server 350; therefore, path generation program 400 assigns a different target, which is described by a tuple as server 360/communication adapter A361/port VP343.

Figure 7:
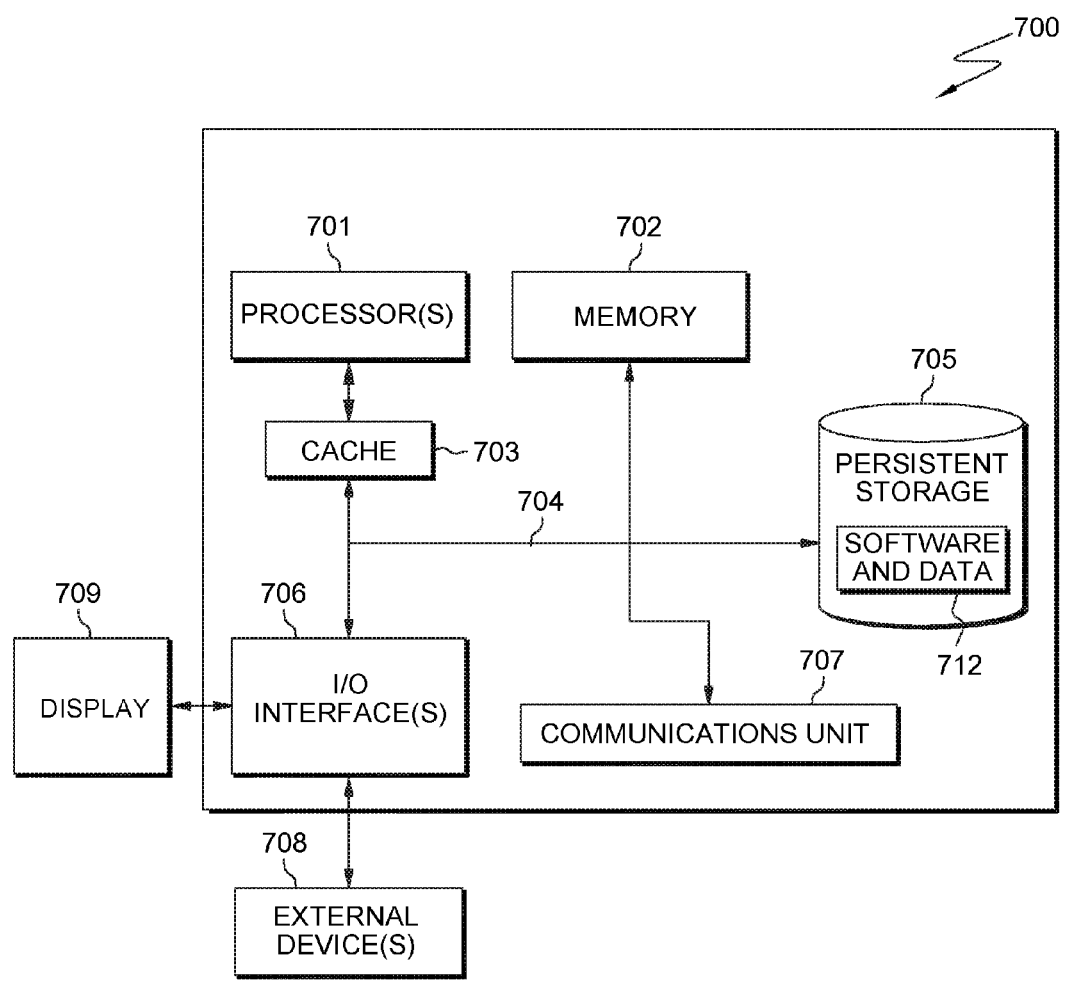
FIG. 7 depicts a block diagram of components of a computer, in accordance with an embodiment of the present invention.

FIG. 7 depicts computer system 700, which is representative of computing system 102 and storage 105. Computer system 700 is an example of a system that includes software and data 712. Computer system 700 includes processor(s) 701, cache 703, memory 702, persistent storage 705, communications unit 707, input/output (I/O) interface(s) 706, and communication fabric 704. Communications fabric 704 provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of processor(s) 701 by holding recently accessed data, and data near recently accessed data, from memory 702. With respect to computing system 102, memory 702 includes, at least in part, designated memory 124 (e.g., physical hardware) depicted in FIG. 1 to be shared among logical partitions.

Program instructions and data used to practice embodiments of the present invention may be stored in persistent storage 705 and in memory 702 for execution by one or more of the respective processor(s) 701 via cache 703. In an embodiment, persistent storage 705 includes a magnetic hard disk drive. Alternatively, or in addition to a magnetic hard disk drive, persistent storage 705 can include a solid-state hard drive, a semiconductor storage device, a read-only memory (ROM), an erasable programmable read-only memory (EPROM), a flash memory, or any other computer readable storage media that is capable of storing program instructions or digital information. With respect to computing system 102, persistent storage 705 includes, at least in part, disks 122 (e.g., physical hardware) depicted in FIG. 1 to be shared among logical partitions.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705. Software and data 712 are stored in persistent storage 705 for access and/or execution by one or more of the respective processor(s) 701 via cache 703 and one or more memories of memory 702. With respect to computing system 102, software and data 712 includes hypervisor 120, communication routing program 125, path generation program 400, alternate path selection program 500, and other programs.

Communications unit 707, in these examples, provides for communications with other data processing systems or devices, including resources of computing system 102 and processors 121. In these examples, communications unit 707 includes one or more network interface cards. Communications unit 707 may provide communications through the use of either or both physical and wireless communications links. With respect to computing system 102, hypervisor 120, virtual adapter 140, virtual adapter 150, virtual adapter 160, bus 190, and program instructions and data used to practice embodiments of the present invention may be downloaded to persistent storage 705 through communications unit 707. With respect to computing system 102, communication unit 707 includes, at least in part, one or more network cards 123 (e.g., physical hardware), virtual adapter 140, virtual adapter 150, virtual adapter 160, communication adapter 171, communication adapter 177, communication adapter 181, and communication adapter 187 depicted in FIG. 1, to be shared among logical partitions.

I/O interface(s) 706 allows for input and output of data with other devices that may be connected to each computer system. For example, I/O interface(s) 706 may provide a connection to external device(s) 708, such as a keyboard, a keypad, a touch screen, and/or some other suitable input device. External device(s) 708 can also include portable computer readable storage media such as, for example, thumb drives, portable optical or magnetic disks, and memory cards. Software and data used to practice embodiments of the present invention can be stored on such portable computer readable storage media and can be loaded onto persistent storage 705 via I/O interface(s) 706. I/O interface(s) 706 also connect to display device 709.

Display device 709 provides a mechanism to display data to a user and may be, for example, a computer monitor. Display device 709 can also function as a touch screen, such as the display of a tablet computer or a smartphone.

It is understood in advance that although this disclosure discusses system virtualization, implementation of the teachings recited herein are not limited to a virtualized computing environment. Rather, the embodiments of the present invention are capable of being implemented in conjunction with any type of clustered computing environment now known (e.g., cloud computing) or later developed.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for routing communication paths among computing devices, the computer program product comprising:
   one or more computer processors;
   one or more computer readable storage media; and
   program instructions stored on the computer readable storage media for execution by at least one of the one or more processors, the program instructions comprising:
   program instructions to identify a computing entity and a data storage entity that transfer data;
   program instructions to determine a plurality of communication ports that the data storage entity utilizes to transfer data to the computing entity;
   program instructions to identify a plurality of computing resources respectively associated with the determined plurality of communication ports that the data storage entity utilizes to transfer the data to the computing entity; and
   program instructions to generate a list of tuples for the data storage entity based, at least in part, on the identified plurality of computing resources and the determined plurality of communication ports;
      wherein the list of tuples for the data storage entity comprises information corresponding to computing resources that include: a server identifier, a communication adapter identifier, and a communication port identifier;
      wherein the communication adapter identifier is respectively associated with a server; wherein the communication port identifier is respectively associated with a communication adapter; and
      wherein the communication port identifier corresponds to at least one of a physical computing resource and a virtualized computing resource;
   program instructions to sort the generated list of tuples such that the generated list of tuples is cyclically ordered based on a hierarchy of: the server identifier, the communication adapter identifier, and the communication port identifier; and
   program instructions to identify a rule associated with the computing entity, wherein the rule dictates a number of communication paths that the computing entity utilizes to transfer data between a communication port of the computing entity and the plurality of communication ports of the data storage entity; and
      program instructions to assign a group of communication port identifiers from the generated list of tuples to the communication port of the computing entity such that the number of the group of assigned communication ports is based, at least in part, on the rule associated with the computing entity.

* * * * *